July 15, 1952 R. S. FOX ET AL 2,603,001
TEMPERATURE COMPENSATED GAUGE
Filed March 1, 1945
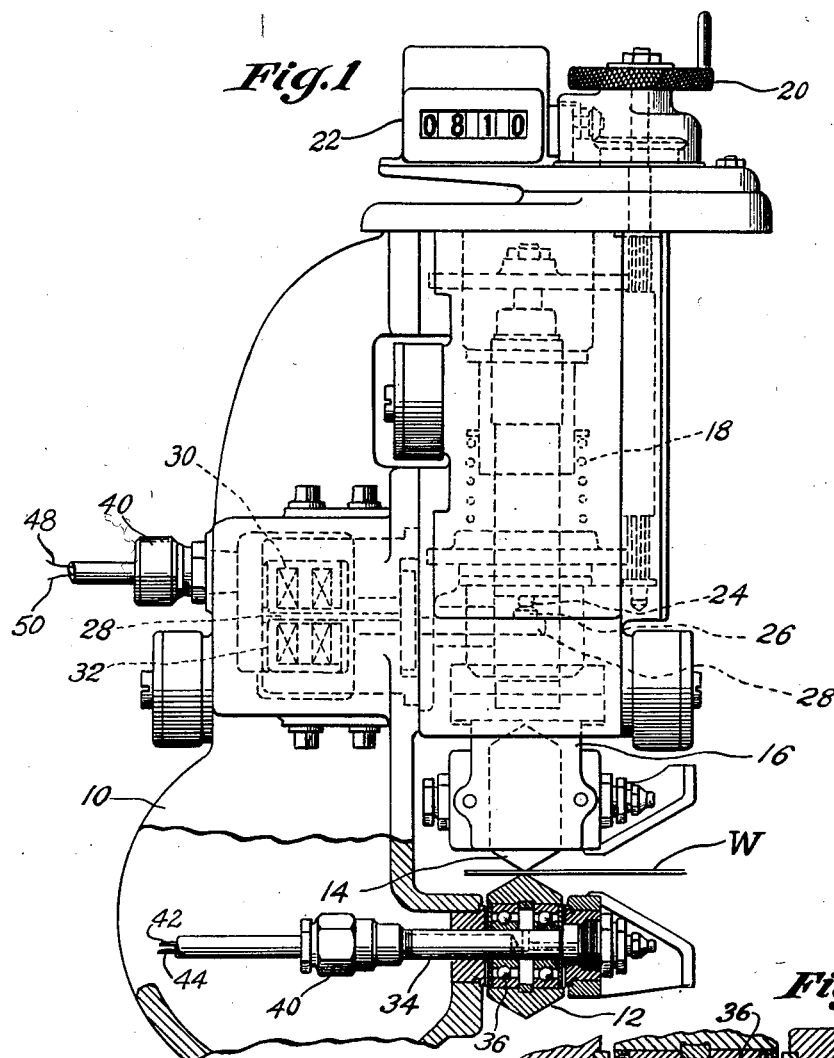
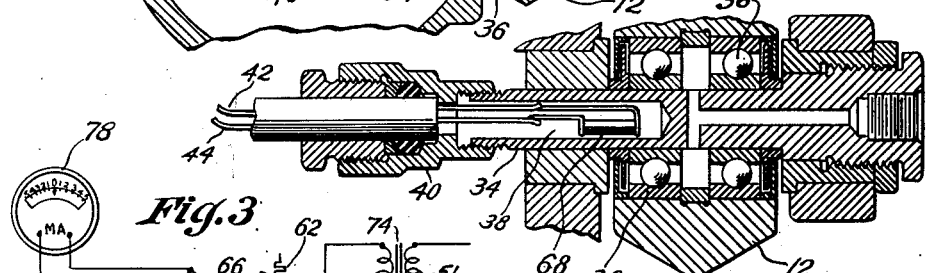
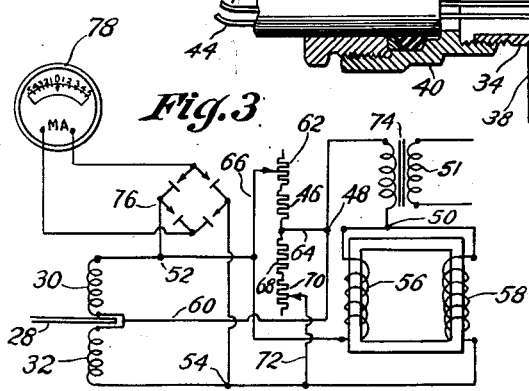
INVENTORS
Raymond S. Fox
Albert M. Dexter jr.
BY Joseph M. Schofield
ATTORNEY Patented July 15, 1952

2,603,001

UNITED STATES PATENT OFFICE 2,603,001

TEMPERATURE COMPENSATED GAUGE

Raymond S. Fox, West Hartford, and Albert M. Dexter, Jr., Farmington, Conn., assignors to Niles-Bement-Pond Company, West Hartford, Conn., a corporation of New Jersey Application March 1, 1945, Serial No. 580,430

3 Claims. (Cl. 33—147)

The present invention relates to dimension gages and particularly to a gage for continuously measuring the thickness of a strip of metal or other material while it is being rolled or otherwise processed and while being rapidly traversed between the work engaging members of the gage.

With the rolling mill speeds used in the past, gages of the type described herein have been sufficiently accurate without any provision being required for correcting errors introduced by temperature variations in the members of the gage. However, with increased demands for high precision and increased production of steel, there has been a considerable demand for greatly increased rolling speeds. Since the strip being rolled becomes heated, the temperature of parts of the gage nearer the strip tends to increase during operation. Also the rapid rotation of the work engaging members within their bearings causes them to increase in temperature.

The present invention is illustrated and described as applied to a continuous gage of the type shown in the patents to Spencer B. Terry et al. No. 2,115,351, granted April 26, 1938 and to Spencer B. Terry No. 2,137,368, granted November 22, 1938. It will be understood, however, that the temperature compensating means may be applied to any dimension gage of the electrical type having a bridge circuit.

An object of the invention is to provide, in a gage of the type described, means for compensating the gage for variations in the temperature of the different parts of the gage structure.

Another object is to provide, in a gage of the type described, means responsive to the temperature of one of the work contacting elements of the gage for compensating any error due to changes in such temperature.

Another object is to provide, in the electrical circuit of a dimension gage, an element having an electrical characteristic variable with temperature for compensating the gage for errors due to temperature changes.

A feature of importance of the invention is that the compensation element may be a resistance element having a negative temperature coefficient, this element being inserted in one side of the bridge forming a part of the electrical circuit of the gage.

With the above and other objects in view, the invention comprises the features of construction and operation set forth in the following specification and illustrated in the accompanying drawings.

In the accompanying drawings annexed hereto and forming a part of this specification, we have shown the invention embodied in a particular form of gage for gaging all types of metals while being rolled into relatively thin sheets or strips, but it will be understood that the invention can be otherwise embodied and that the drawings are not to be construed as defining or limiting the scope of the invention, the claims appended to this specification being relied upon for that purpose.

In the drawings:

Figure 1 is a side elevational view of a complete gaging head with a portion of its structure cut away to illustrate the structure of the temperature compensating element used in the gage.

Fig. 2 is an enlarged cross sectional view of one of the work engaging members and the arbor on which it is mounted, showing the temperature compensating element mounted within the arbor; and Fig. 3 is an electric wiring diagram showing a preferred form of circuit used with the gage shown in Figs. 1 and 2 and in which is included the temperature compensating element.

In the above mentioned drawings there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a pair of work engaging members adapted to contact opposite surfaces of the work being gaged, the members shown comprising rolls mounted for rotation on anti-friction bearings; second, a frame spanning the material being gaged for supporting the two work engaging members; third, means on the frame for adjusting the position of one of the members toward and from the other and for indicating its adjusted position; fourth, an electrical circuit including an electrical indicating instrument for measuring deviations of the movable member from its normal or central position for the adjustment for any thickness; and fifth, a temperature sensitive electrical resistance element connected in the electrical circuit and subject to the temperature of one of the members so as to correct the operation of the indicating instrument for errors introduced by variations in temperature of the gage members.

Referring more in detail to the individual figures of the drawing, there is illustrated a frame or body member 10 which supports a pair of rolls 12 and 14 for engagement with the opposite sides of a work piece or strip W.

The upper roll 14 is supported on a slide 16 which is vertically movable within the frame member 10 and is biased into engagement with the work piece by a spring 18. The normal vertical position of the slide 16 and roll 14 may be adjusted by means of a micrometer screw having a hand wheel 20 associated therewith for varying the adjustment and an indicating counter 22 for indicating the work thickness the adjustment for which the roll is set. A button 24 associated with the slide 16 engages a button 26 on one end of an armature 28. The armature 28 is fulcrumed at its center and its opposite end lies between a pair of coils 30 and 32, which are connected in an electrical bridge circuit illustrated in Fig. 3.

The slide 16 and its related supporting, adjusting and adjustment indicating elements are shown and described in detail in the patents to Terry et al. and Terry referred to above. It is believed that further description of these mechanical elements will therefore be unnecessary.

The lower roll 12 is journaled on a fixed arbor 34 mounted in the frame 10. Anti-friction bearings 36 between the roll 12 and the arbor 34 permit ready rotation of the roll when the work being gaged is passed through the gage. The end of arbor 34 which projects inside the hollow casing formed by frame 10 is provided with an axially extending bore 38. An electrical connector 40 is threaded on the end of the arbor 34. A pair of electrical conductors 42 and 44 pass through the connecter 40 and into the bore 38 in the arbor 34. Inside the bore 38, these two conductors are attached to and support an electrical resistance element 68. The element 68 is preferably of carbon or other suitable electrical resistance material having appreciable negative temperature coefficient of resistance. This element 68 at higher temperature becomes less resistant to current flow instead of becoming more resistant as in the case of most metal conductors such as copper. It is by means of this negative resistance characteristic of element 68 that temperature compensations are effected.

Fig. 3 illustrates an electrical bridge circuit in which the impedance coils 30 and 32 and the resistance element 68 are connected. The bridge circuit in Fig. 3 has a pair of input terminals 48 and 50 and a pair of output terminals 52 and 54. The input terminals 48 and 50 may be and preferably are connected to the opposite ends of the secondary of a transformer 51, the primary of which receives its voltage from any suitable source. In each of the two arms of the bridge circuit which connect the input terminal 50 to the respective output terminals 52 and 54 is one of a pair of fixed impedances 56 and 58. The impedance 56 is connected between input terminal 50 and output terminal 52 and the fixed impedance 58 is connected between input terminal 50 and output terminal 54. The two coils 30 and 32 are connected at their central points to the input terminal 48 and at their opposite ends to the respective output terminals 52 and 54 of the bridge circuit. The connection between input terminal 48 and output terminal 52 may be traced from terminal 48 through a conductor 60, and coil 30 to output terminal 52. The connection between input terminal 48 and output terminal 54 may likewise be traced through conductor 60 and coil 32.

Connected in parallel with the arm of the bridge which includes the coil 30, is a branch including the fixed resistance 46 and a manually adjustable resistance 62. This parallel branch may be traced from input terminal 48 through a conductor 64, fixed resistance element 46, the adjustable resistance 62, and the conductor 66 to output terminal 52.

Connected in parallel with the arm of the bridge which includes coil 32 is another branch which may be traced from input terminal 48 through a negative coefficient resistance 68, a manually adjustable resistance 70, and a conductor 72 to output terminal 54.

The adjustable resistance 62, together with the fixed resistance 46, determines the total resistance between input terminal 48 and output terminal 52 which must be balanced by the total resistance between input terminal 48 and output terminal 54 if the output of the branches of the bridge circuit is to be equal and opposite and thus zero. The adjustable resistance 62 is therefore termed the "zero" adjustment of the bridge circuit and the resistance 46 the "balancing" resistance.

The adjustable resistance 70 determines the effect which a given change in the variable resistance of element 68 will have upon the unbalance of the bridge circuit. For example, if all the resistance of element 70 is connected in series with elements 68, then the percentage change in the total resistance between input terminal 48 and output terminal 54 caused by a given change in resistance of element 68 due to a temperature change, is relatively small. On the other hand, if resistance 70 is adjusted so that its value is substantially zero, then the same change in resistance of element 68 will produce a relatively large percentage change in the total resistance between input terminal 48 and output terminal 54. The manually adjustable resistance 70 is therefore termed the "sensitivity adjustment."

Electrical power is supplied to the bridge circuit through a transformer 74, the primary of which may be connected to an available A. C. power supply, although it will be readily understood that any other suitable source may be used. The output of the bridge circuit is rectified by a plate or bridge rectifier illustrated at 76 and the rectified output is supplied to a milliammeter 78 or other electrical indicating instrument preferably having a central zero on its scale. If desired, any other suitable measuring or controlling instrument might be used in place of milliammeter 78.

With the exception of the temperature compensating member 68, the circuit shown in Fig. 3 is similar to those made use of in the Terry et al. and Terry patents referred to above. Similar bridge circuits in dimension gages are also shown and described in the patents to Mershon 1,640,464 and Hathaway 2,240,184, and in numerous other patents. As no claim is made to the circuit described in this application, except when an element having a negative resistance characteristic is employed in one side of the bridge, no further description of the circuit is thought to be necessary.

When a gage of this type is in use, the rolls tend to heat more than the frame because the rolls are in direct contact with the strip which is heated by the rolling process and in addition because they are heated by rotation on their bearings. On the other hand the mass of the frame 10 makes it slower to change its temperature. As the rolls become heated and expand slightly, the upper roll 30 tends to be forced upwardly so that it indicates that the strip is thicker than it actually is. The slower and less temperature rise of the gage frame has much less effect on the indicated dimension. Its effect is to indicate on the indicator a less dimension of the work than it actually is. The difference between these errors is substantially corrected by the introduction of the negative coefficient resistance element 68. Therefore, in order to provide temperature compensation the temperature sensitive element 68 must be placed in the circuit and operate in such a manner as to decrease the reading of the meter 78 as the temperature increases.

As the measuring rolls 12 and 14 expand due to their higher temperatures the slide 16 is moved upwardly, thereby moving the button 24 upwardly and causing the armature 28 to rotate in an anti-clockwise direction, as viewed in Fig. 1, about its central fulcrum. Therefore the left end of armature 28 as seen in Fig. 1 is moved downwardly toward coil 32 and away from coil 30. The impedance of coil 32 is thereby increased and the impedance of coil 30 is decreased. The meter 78 is so connected to the bridge circuit that an unbalance of the impedances of the two coils 30 and 32 in this sense produces a "high" reading on the meter. However, if this high reading is due to the temperature of the rolls, then the resistance element 68 comes into play. Since it is chosen from a class of resistances having a negative coefficient, its resistance decreases when the temperature rises and the impedance of that side of the bridge which includes coil 32 increases. Therefore it compensates for the increased impedance of coil 32, with which it is connected in parallel. If the sensitivity and zero adjustments are properly made by resistances 62 and 70, respectively, the decrease in the resistance of element 68 may be made to compensate substantially for errors in the reading of the meter due to erroneous unbalance of the coils 30 and 32 because of temperature conditions.

The introduction of the negative coefficient resistance element 68 into one side of the bridge circuit does not affect the voltage between the output terminals 52 and 54 when the bridge is unbalanced by movement of the armature 28 and the temperature remains normal. The resistance element 68 therefore does not vary the magnification of the gage to any appreciable degree. Corresponding displacements of the armature 28 will give corresponding displacements of the pointer of the indicating instrument 78 with or without the resistance element 68 included in the circuit. No changes, therefore, will be required in the characteristics of the indicating instrument used with the present circuit over those of the instrument used in the circuit of the above-mentioned patent.

What we claim is:

1. Temperature compensating means for a dimension gage comprising a pair of work contacting members for engaging opposite sides of a work piece, frame means for relatively adjustably supporting said work contacting members, an electric indicating instrument for indicating variations from the adjusted spacing of said contacting members, a bridge circuit for said indicating instrument, and an element having a negative resistance characteristic in one of the branches of said circuit for compensating the readings of said indicating instrument during gaging operations for errors introduced by temperature variations.

2. Temperature compensating means for a dimension gage comprising a pair of work contacting members for engaging opposite sides of a work piece, frame means for relatively adjustably supporting said work contacting members, an electric indicating instrument for indicating variations from the adjusted spacing of said contacting members, a bridge circuit for said indicating instrument, and an element having a negative resistance characteristic in one branch of said bridge circuit for compensating the readings of said indicating instrument during gaging operations for errors introduced by temperature variations.

3. Temperature compensating means for a dimension gage comprising a pair of contacting members for engaging opposite sides of a work piece, frame means for relatively adjustably supporting said contacting members, means associated with said frame means for indicating the spacing of said contacting members and thereby indicating the thickness of the work piece at normal temperature, an electrical indicating instrument having a bridge circuit for indicating variations from the adjusted spacing of said contacting members, and an element having a negative resistance characteristic for varying the impedance in one side of said bridge circuit for said electrical indicating instrument during gaging operations to eliminate errors introduced by temperature variations, said element being housed within one of the work contacting members.

RAYMOND S. FOX.
ALBERT M. DEXTER, JR.

REFERENCES CITED

The following references are of record in the file of this patent:

UNITED STATES PATENTS

| Number | Name | Date |
| --- | --- | --- |
| 2,115,351 | Terry | Apr. 26, 1938 |
| 2,137,368 | Terry | Nov. 22, 1938 |
| 2,165,647 | Oehmichen | July 11, 1939 |
| 2,276,816 | Bagno | Mar. 17, 1942 |
| 2,323,267 | Wittkuhns et al. | June 29, 1943 |
| 2,344,642 | Ruge | Mar. 21, 1944 |
| 2,370,609 | Wilson | Feb. 27, 1945 |
| 2,396,420 | Hayward et al. | Mar. 12, 1946 |